United States Patent [19]
Topel, Jr. et al.

[11] Patent Number: 5,212,422
[45] Date of Patent: May 18, 1993

[54] LAMP CAPSULE SUPPORT BASE

[75] Inventors: A. Charles Topel, Jr., Boston; Lewis H. Palmer, III, Marblehead; Stephen J. Leadvaro, Salem; Peter R. Gagnon, Topsfield; Roy C. Martin, Peabody, all of Mass.

[73] Assignee: GTE Products Corporation, Danvers, Mass.

[21] Appl. No.: 814,856

[22] Filed: Dec. 30, 1991

[51] Int. Cl.$^5$ .................. H01J 17/16; H01J 9/24; H01J 61/34
[52] U.S. Cl. ...................... 313/318; 313/25; 445/27
[58] Field of Search .......... 313/318, 25, 580; 445/23, 27, 44; 439/86, 604, 605, 611, 616, 617, 619, 935, 936

[56] References Cited

U.S. PATENT DOCUMENTS

| | | | |
|---|---|---|---|
| 2,838,713 | 6/1958 | Macksound | 313/25 X |
| 2,904,710 | 9/1959 | Beeninga et al. | 313/25 |
| 3,249,781 | 5/1966 | Smialek et al. | 313/25 |

Primary Examiner—Sandra L. O'Shea
Attorney, Agent, or Firm—Joseph S. Romanow

[57] ABSTRACT

A support for a filament or lamp capsule in a lamp having a base and a light-transmissive envelope includes a support ring that is inserted into the base. The ring can be pressed or otherwise secured into the base. The support ring includes at least one pair of tabs that extend radially inwardly. The tabs include mounting holes aligned generally in a direction extending upwardly from the base toward the envelope for receiving and supporting an electrical lead of the filament or lamp capsule. The tabs can be resilient to forcibly engage the lead of the filament or lamp capsule. Two pairs of tabs can be provided to support two leads of the filament or lamp capsule.

18 Claims, 3 Drawing Sheets

LAMP CAPSULE SUPPORT BASE

FIELD OF INVENTION

This invention relates to electric lamps and, more particularly, to a support ring for a lamp capsule.

BACKGROUND OF INVENTION

It is common in the structure of high intensity lamps to utilize a pressurized inert gas filled capsule having a long filament and a pair of leads connected from the filament to the lamp base. A prior art lamp 20 is depicted in partially exposed perspective view in FIG. 1. The depicted lamp is used generally in commercial and retail settings to brightly illuminate a particular area such as store windows. A filament capsule 22 is enclosed within a second larger translucent tubular outer envelope 24 that is sealed to the base. The base 26 is a bayonet style cylindrical enclosure. The lamp 20 is common in European applications and is known as the T or BT style lamp. This lamp operates in the 220–250 range. The base is typically constructed of conductive metal, that electrically connects each of the capsule s conductive leads 28 to corresponding contacts in a light fixture socket (not shown). The leads 28 in this example comprise a pair of filament leads 29 that are electrically connected to a pair of base leads 31, which extend upwardly from the base 26 to a point just below the capsule. This configuration provides for easy attachment of the capsule to the base.

It is important to position the capsule 22 appropriately within the light transmissive portion of the outer envelope 24. It is sometimes also important to position the capsule 22 with respect to base 26. In so positioning the capsule, it may be necessary to extend the leads 28. Since the leads are somewhat smaller in diameter relative to their lengths they may not have sufficient strength to support the weight of the capsule.

Prior art capsule leads have been supported by surrounding them with a ceramic insert 30 (shown also individually in FIG. 2) that extends from the bottom of the lamp base 26 up to the lower end 32 of the capsule 22. The leads extend along inner, axially-disposed channels 34 in the insert 30. The capsule 22 may be partially seated within preformed indents 36 at the top of the ceramic insert 30. These indents 36 may include recesses for receiving adhesive or cement to permanently seat the capsule in the insert. While the insert 30 satisfactorily isolates the leads 28 and supports the capsule 22, thus preventing bending and twisting of the capsule/lead structure within the lamp, the insert 30 adds substantial weight to the lamp and is prone to chipping from applied shock and vibration. The ceramic insert is also somewhat expensive due to high material and construction costs and, therefore, contributes to higher lamp construction costs.

It is a general object of the present invention to provide improved capsule supports for lamps that utilize filament capsules.

It is a further object of the present invention to provide a capsule support base, particularly adapted for use with sealed filament capsules, that is lower in weight and cost than conventional ceramic inserts and that exhibits durability equal to or greater than ceramic inserts.

It is another object of this invention to provide a capsule support base that can be utilized with existing lamp components with minimal modification thereof.

SUMMARY OF INVENTION

A support for a filament or capsule in a lamp that includes a substantially cylindrical base and a light-transmissive envelope comprises a ring that is mountable within the base. The ring includes a outer diameter that is substantially equal to or slightly greater than a inner diameter of the base so that the ring may be installed in the base with its outer perimeter engaging an inner wall of the base. The ring includes at least one pair of supporting tabs that are directed radially inwardly from the outer perimeter of the ring. The pair of tabs can extend from opposing edges of the ring and can be positioned so that they are aligned with each other. Each tab includes a mounting hole for receiving an electrical lead of a filament or filament capsule. In particular, the tabs are positioned so that the filament lead extends from the lamp capsule through the holes in the tabs to the base. In this manner, the lead is supported along its length and is spaced from the sides of the base and the lamp envelope.

The support ring can include two pairs of tabs for supporting two separate filament leads. These tabs can be positioned on opposite sides of the ring. The tabs can be spring loaded so that they bear with a spring force on the lead when it is positioned through the tab mounting holes.

BRIEF DESCRIPTION OF THE DRAWINGS

The foregoing objects and advantages of the invention will become more apparent with reference to the following detailed description of preferred embodiments and brief description of the drawings in which.

DETAILED DESCRIPTION

Figure 3:
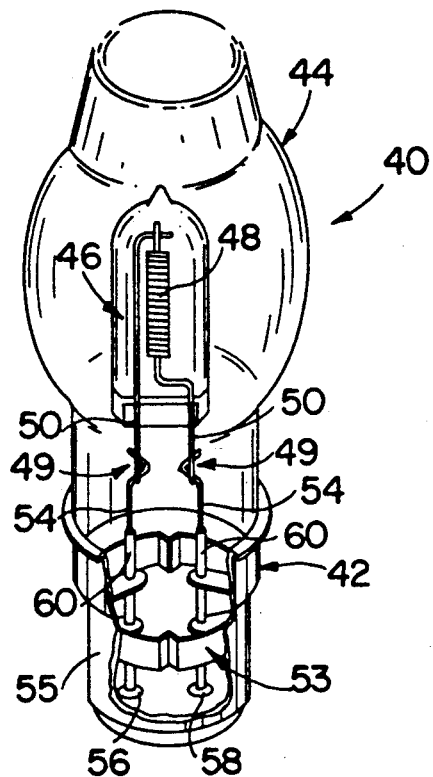
FIG. 3 is a partially exposed perspective view of a lamp having a support base according to this invention.

A lamp having a support base according to one embodiment of the invention is depicted in FIG. 3. A lamp 40 comprises a metallic base 42, a light-transmissive lamp envelope 44, typically constructed of glass, and an inner gas-filled capsule 46, typically of high temperature resistant glass or quartz, that encloses a high voltage filament 48. The capsule is supported in the envelope 44 by a pair of electrically conductive capsule leads 50 exiting its bottom end 52. The capsule leads 50 are connected to base leads 54, which are supported along their lengths by a supporting ring structure 53, positioned within a narrowed diameter portion 55 of the base 42.

Figure 1:
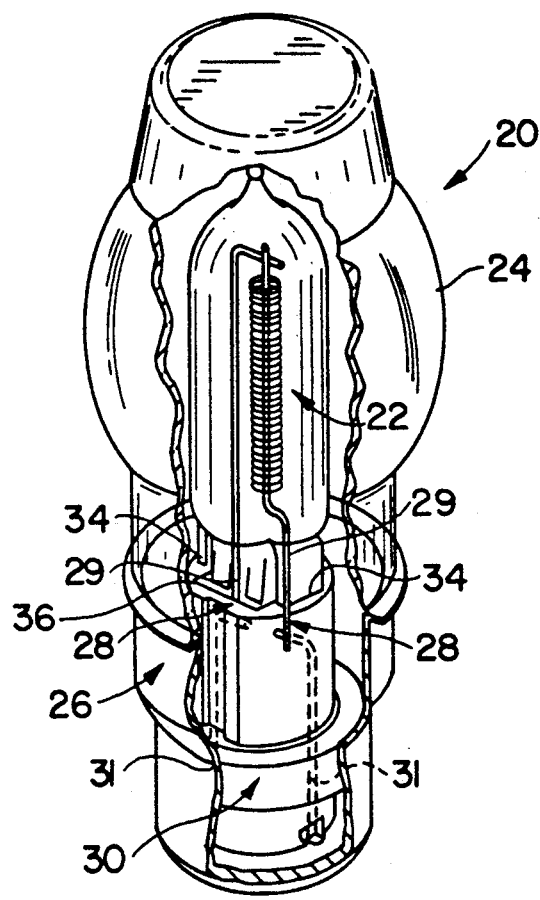
FIG. 1 is a partially exposed perspective view of a lamp having a filament capsule supported by a ceramic base according to the prior art.
Figure 2:
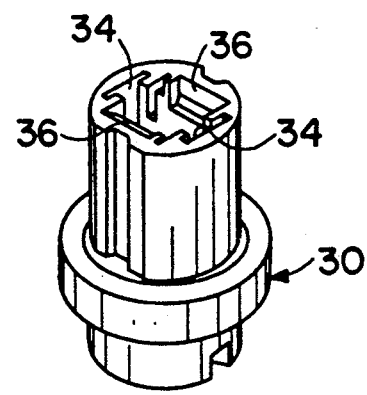
FIG. 2 is a perspective view of a ceramic support insert of FIG. 1.

Unlike the prior art design of FIGS. 1 and 2, the bottom end 52 of the capsule 46 is not supported by a ceramic insert. Instead, each of the capsule leads 50 is electrically and mechanically interconnected with associated base lead 54 that provides full mechanical support for the capsule 46. Note that it is possible according to an alternative embodiment to provide a set of capsule leads that extend directly downwardly to the base 42 without an interconnecting set of base leads. The base leads 54 extend downwardly into the base 42 where they join with base-mounted electrical contacts 56, 58. As defined herein, "upwardly" and "downwardly" shall mean a direction that is coaxial with the lamp base and either extends "upwardly" from the base to the envelope or "downwardly" from the envelope to the base.

Figure 4:
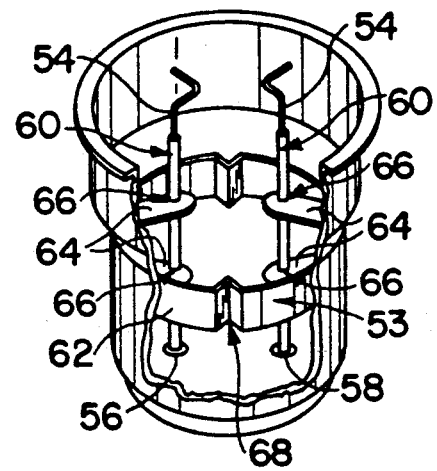
FIG. 4 is a partially exposed perspective view of the support base structure of FIG. 3.

Further details of the base are shown in FIG. 4. Each of the base leads 5 is approximately 0.040-0.060 inches in diameter and is encased in an outer insulating tube 60 that adds rigidity to the structure and insulates the base lead wire 54 from the ring 53. The leads 54 are positioned substantially parallel and spaced from each other within the base 42. The ring 53 comprises a strip 62 of flat material that includes pairs of opposing tabs 64 that extend radially inwardly from upper and lower edges of the strip 62. The tabs 64 include holes 66 that are adapted to receive the base leads 54. The holes 66 are aligned axially to enable the base leads 54 to extend axially from the base to the capsule leads 50.

The insulating tubes 60 in this embodiment can comprise rigid glass or ceramic material through which metallic conducting wire base lead 54 passes. A tube outer diameter of approximately 0.060-0.080 inch is sufficient to provide good capsule support. Since the ring 53 according to this embodiment is metallic, the absence of the insulating tubes 60 would cause the wire base leads 54 to short circuit through the ring. The leads 54 might also lack sufficient rigidity to prevent unacceptable sway and rotation of the capsule without the additional reinforcement provided by the tubes 60. The insulating tubes provide sufficient support to maintain the capsule 46 in an essentially fixed position relative to the lamp base 42 and outer envelope 44.

Note that it is contemplated according to this invention to incorporate an insulator directly into the ring 53, thus eliminating the need for an insulator such as the tubes 60 around the leads 54. Such insulation could include a nonconductive coating on all or part of the ring where it contacts current carrying conductive elements.

The ring 53 according to this embodiment is constructed of a somewhat flexible metal that is elastically deformable under predetermined loading. A beryllium copper alloy can be utilized for the ring 53 according to this embodiment. The ring can be formed from a flat piece of sheet material that is stamped to include the supporting tabs as opposing projections from the upper and lower edges of an otherwise rectangular strip. The strip of sheet material is then formed into a ring and joined at its ends to provide the ring structure. Joining can be accomplished by a variety of methods, including soldering, swaging or other conventional metal joining techniques. The tabs are then folded along a line with the ring edges 57 to project radially inwardly, thereby providing the ring support structure.

Figure 5:
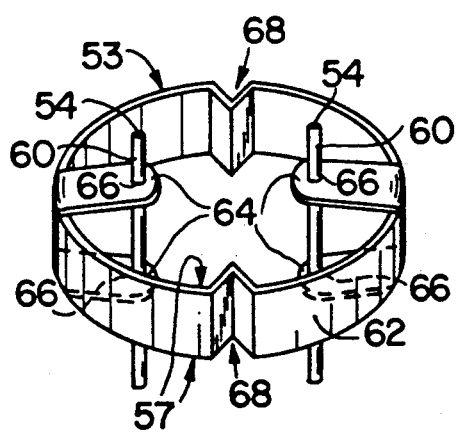
FIG. 5 is a more detailed perspective view of the support ring of FIG. 3.
Figure 6:
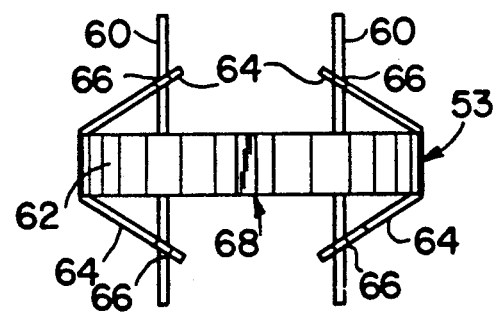
FIG. 6 is a side view of the support ring of FIG. 5.

A somewhat resilient ring 53 material is used to maintain pressure against the insulating tubes 60 for retention of insulating tubes 60. As the tubes 60 are inserted into the ring tabs, the tabs are deformed into positions in which they are essentially parallel to each other and as depicted in FIG. 5. This allows resistance free sliding of the tubes 60 into the holes 66. The tabs expand outwardly from each other when they are released. The holes 66 are closely matched in diameter to the outer diameters of the tubes 60. Thus, as the tabs 64 spread out, they engage the tubes 60. In this configuration, the tabs 64 bear against the sides of each tube 60 and frictionally prevent it from moving out of position relative to the ring 53. Thus, no adhesives or other supplemental attachment means are required to maintain the tubes 60 in position relative to the tabs or the ring. The tubes should be sized slightly less in outer diameter than the inner diameter of the tab holes. In this manner, a strong retention force is exerted by the tabs. After leads 54 are attached to the base contact 56, 58, such as by soldering, the assembly is better able to resist axial forces, because the attached leads 54 cooperate with the tabs 64.

The outer diameter of the ring 53 is sized to closely match the inner diameter of the lamp base 42. The ring 53 is securely inserted into the lower, narrowed diameter, portion 55 of the base 46. Following insertion of the ring 53 into the base 42, the ring 53 can be permanently joined to the base 42 by a variety of methods. In this embodiment, the ring 53 includes a pair of radially inwardly directed folds 68 positioned at 90° angles along the ring 53 from the tabs 64. The outer diameter of the ring 53 including the folds 68 is, as stated, sized to securely enrage the inner diameter of the lower portion 55 of the lamp base 42.

When the ring 53 is properly positioned within the base 42, one or both of the folds 68 can be crimped radially outwardly toward the inner wall of the lamp base 42. This crimping can be accomplished by means of jaws that engage the fold 68 and outer wall of the base or, alternatively, by means of expanding jaws positioned within the base 42 that extend outwardly toward the opposing folds 68. The "flattening" of the folds against the base 42 walls causes an increase in the ring s free diameter which results in a corresponding radially outward force in the ring 53 as it bears upon the inner wall of the base 42. This force significantly increases the contact pressure between the ring and the base, resulting in a strong interfering frictional fit (press fit) between the ring 53 and the lamp base 42.

While a press fit between the ring 53 and base 42 is achieved according to this embodiment by utilizing crimped folds 68, it is equally possible to secure the ring 53 to the base 42, using an unfolded press fit ring of slightly larger fixed outer diameter than the base inner diameter that is forcibly driven vertically into the base 42 causing an interference fit therebetween. Alternatively, a ring having little or no interference fit can be attached to the base by inserting it into the base 42 and subsequently spot welding or soldering the components together.

While the embodiment of the invention shown in FIGS. 3-6 employs two pairs of tabs 64 for mounting two base leads 54, it may be preferred for certain applications to provide a support ring with only one pair of lead support tabs. A support base structure and ring 70 having only one pair of supporting tabs 64 is depicted generally in FIGS. 7-9. This single lead-type construction might find application for lamps known as "double end" types, which have one lead at each end. For standard size filament capsules having, for example, an 11 mm outer diameter and for capsules having short leads that do not extend substantially into the base 42, it has been found that a single support lead 72 is sufficient to provide adequate support for the lamp capsule. Lamps with longer leads and larger capsules may still require two pairs of supporting tabs, but most conventionally-sized lamps of the type contemplated herein require only one lead to be supported, while the second lead (not shown, but which may comprise separate capsule and base lead portions) extends to the base contact without additional support thereof.

The support ring 70, having only one pair of tabs 64 according to this embodiment, is firmly attached to the base 42 by a variety of fastening methods, which may include crimpable folds 68. The support tabs 64 are deformed toward each other but have sufficient resilience to firmly engage the insulator tube 76. In the single tab pair embodiment, the unsupported lead and its connections (not shown) must have sufficient tensile strength to resist stretching and breakage. Otherwise, the filament capsule may tend to rotate about the supported lead in absence of an anchoring force exerted by the unsupported lead.

Figure 7:
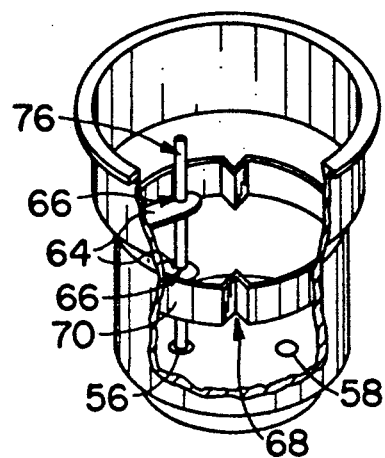
FIG. 7 is partially exposed perspective view of an alternative embodiment of the support base structure according to this invention.
Figure 8:
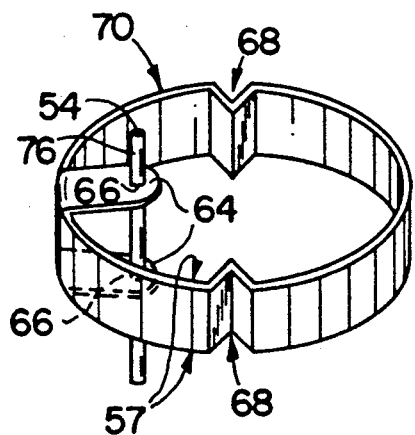
FIG. 8 is a perspective view of the support ring of FIG. 7.
Figure 9:
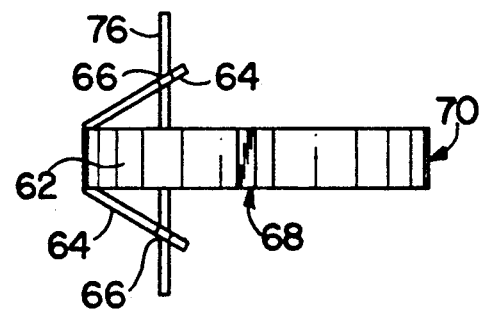
FIG. 9 is a side view of the support ring of FIG. 8.

The preferred single tab pair embodiment shown in FIGS. 7-9 is even less expensive and simpler to manufacture than the double tab pair embodiment of FIGS. 3-6. Additionally, the complete lamp utilizing a ring according to this embodiment is more quickly and less expensively manufactured than prior art lamps, since only a single support tube lead assembly must be constructed.

It should be understood that the preceding is merely a detailed description of possible embodiments. It should be apparent to those skilled in the art that various modifications and equivalents may be made without departing from the spirit or scope of the invention. The preceding description is meant, therefore, to be taken only by way of example and not to otherwise limit the scope of the invention.

What is claimed is:

1. A lamp comprising:
   a substantially cylindrical base;
   a light-transmissive outer envelope;
   a filament or lamp capsule having at least two leads; and
   a support ring mounted within the base, the ring including a ring portion and at least one pair of supporting tabs directed radially inwardly from the ring portion, each tab including a mounting hole for receiving one of the leads, the tabs being positioned so that the respective lead passes through each of the mounting holes and is supported thereby.

2. A lamp as set forth in claim 1 wherein the tabs extend from opposite edges of the support ring.

3. A lamp as set forth in claim 2 wherein each of the mounting holes is sized to substantially match an outer diameter of the respective lead, the tabs being attached to the support ring so that each tab is essentially non-parallel with respect to the other in a resting state, the tabs allowing passage of a lead through the mounting holes when moved parallel to each other and the tabs forcably engaging the lead to hold it in a predetermined position when allowed to return to a resting state.

4. A lamp as set forth in claim 3 wherein the support ring comprises beryllium copper alloy.

5. A lamp as set forth in claim 1 wherein the support ring further comprises at least one radially inwardly extending fold, the fold being adapted to be crimped against the lamp base to secure the ring to the lamp base.

6. A lamp as set forth in claim 1 wherein the support ring includes two pairs of mounting tabs.

7. A lamp as set forth in claim 6 wherein the pairs of mounting tabs are positioned on opposite sides of the support ring.

8. A lamp as set forth in claim 7 wherein each of the pairs of mounting tabs is positioned at a 180° angle along the support ring from the other of the pairs of mounting tabs.

9. A lamp as set forth in claim 3 wherein the support ring includes two pairs of mounting tabs.

10. A lamp as set forth in claim 1 wherein the support ring comprises a metallic material and the lead has an insulating sleeve thereover that engages the mounting tabs.

11. A lamp as set forth in claim 1 wherein the base comprises a bayonet type base.

12. A method of constructing a support base for a lamp capsule in a lamp having a base with an inner wall comprising the steps of:
    providing a support ring having a contact surface sized to enrage the inner wall of the base and having at least one pair of tabs, the tabs being positioned on opposite edges of the contact surface and projecting substantially inwardly toward a center of the support ring, each of the tabs further including a mounting hole;
    inserting the support ring into the base;
    providing a capsule having an electrical lead;
    passing the electrical lead through each mounting hole of the pair of tabs; and
    electrically connecting the electrical lead to the base.

13. A method as set forth in claim 12 further comprising electrically connecting a second electrical lead of the lamp capsule to the base.

14. A method as set forth in claim 13 wherein the step of providing a support ring includes providing a support ring having tabs that are positioned essentially non parallel to each other in a resting state and wherein the step of passing further comprises deforming each of the tabs into a position that is essentially parallel to the other of the tabs as the lead is passed through each mounting hole of the pair of tabs and subsequently allowing the tabs to return to a non-parallel resting state to forcibly bear upon the lead to secure the lead relative to the tabs.

15. A method as set forth in claim 13 wherein the step of providing a support ring includes providing a support ring having two pairs of tabs for receiving each of two leads.

16. In a lamp having a filament or a lamp capsule with at least two leads, the leads interconnected to a lamp base having electrical contacts for electrically connecting the filament or lamp capsule to a power source, the base having an inner wall and the lamp having a light transmissive envelope, a support for maintaining the filament or lamp capsule in a predetermined orientation within the lamp comprising:
    a ring having a contact surface defining an outer perimeter substantially equal in diameter to the inner wall of the base;
    the ring including at least one pair of tabs, each of the tabs extending from an edge of the contact surface in a direction toward an inner portion of the ring, each of the tabs including a mounting hole, each hole being sized and positioned on a respective tab so that a lead extends therethrough when the ring is positioned in the base whereby the tabs support the lead spaced from the inner wall of the base and the envelope.

17. The support as set forth in claim 16 further comprising a second pair of tabs each including a mounting hole therein for enqaqinq a second lead in a position that is substantially parallel to the first lead.

18. A support as forth in claim 16 wherein the ring includes at least one fold along the contact surface, the fold sized and positioned to generate a radially outwardly acting force in the ring when the fold is crimped toward the base with the ring positioned in the base.

* * * * *